United States Patent
Pedone

(10) Patent No.: US 12,482,035 B2
(45) Date of Patent: Nov. 25, 2025

(54) OBJECT SORTED LIST BASED ON HISTORICAL ENTITY INTERACTIONS

(71) Applicant: Truist Bank, Charlotte, NC (US)

(72) Inventor: Jason Pedone, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 294 days.

(21) Appl. No.: 17/963,528

(22) Filed: Oct. 11, 2022

(65) Prior Publication Data

US 2024/0119516 A1    Apr. 11, 2024

(51) Int. Cl.
  *G06Q 40/02* (2023.01)
  *G06F 18/214* (2023.01)
  *G06Q 40/12* (2023.01)

(52) U.S. Cl.
  CPC .......... *G06Q 40/02* (2013.01); *G06F 18/214* (2023.01); *G06Q 40/12* (2013.12)

(58) Field of Classification Search
  None
  See application file for complete search history.

(56) References Cited

U.S. PATENT DOCUMENTS

| | | | | |
|---|---|---|---|---|
| 7,891,562 B1 * | 2/2011 | Saltzman | ............... | G06Q 30/06 235/383 |
| 10,423,999 B1 * | 9/2019 | Doctor | ............... | G06Q 30/0631 |
| 10,659,299 B1 * | 5/2020 | Winters | ............... | H04L 67/12 |
| 10,678,800 B2 * | 6/2020 | Yi | ............... | G06F 16/9535 |
| 11,006,171 B1 * | 5/2021 | Chen | ............... | G06F 16/909 |
| 11,355,228 B2 * | 6/2022 | Appelbaum | ............... | G16H 10/20 |
| 11,645,660 B2 * | 5/2023 | Chopra | ............... | G06Q 30/016 704/270.1 |
| 2002/0184139 A1 * | 12/2002 | Chickering | ............... | G06Q 30/02 705/38 |
| 2009/0292677 A1 * | 11/2009 | Kim | ............... | G06F 16/958 |
| 2009/0299998 A1 * | 12/2009 | Kim | ............... | G06F 16/951 707/999.005 |
| 2010/0057645 A1 * | 3/2010 | Lauritsen | ............... | G06N 5/042 706/11 |
| 2010/0293335 A1 * | 11/2010 | Muthiah | ............... | G06F 12/0813 711/E12.001 |
| 2013/0339105 A1 * | 12/2013 | Russell | ............... | G06Q 10/0639 705/7.42 |
| 2014/0046872 A1 * | 2/2014 | Arnott | ............... | G06Q 40/06 705/36 R |

(Continued)

*Primary Examiner* — Fateh M Obaid
(74) *Attorney, Agent, or Firm* — Kilpatrick Townsend & Stockton LLP; Michael A. Springs, Esq.

(57) ABSTRACT

A system can receive a request to access objects of an entity. The system can access historical data relating to the entity. The system can determine weights corresponding to the objects. The system can determine weights corresponding to the objects based on a number of times a corresponding object has been used by the entity over a predetermined time period, a most recent use of the corresponding object, and an interaction type for which the corresponding object has been most used over the predetermined time period. The system can generate a sorted list by applying the weights. The system can provide a user interface to the user device that presents a first object in a first location and a second object in a second location that is different than the first location based on respective weights of the first object and the second object.

20 Claims, 5 Drawing Sheets

(56) References Cited

U.S. PATENT DOCUMENTS

| | | | |
|---|---|---|---|
| 2014/0075004 A1* | 3/2014 | Van Dusen | G07C 13/00 709/223 |
| 2015/0379562 A1* | 12/2015 | Spievak | G06Q 10/0639 379/265.09 |
| 2016/0173693 A1* | 6/2016 | Spievak | G06Q 30/0269 379/265.09 |
| 2017/0061325 A1* | 3/2017 | Jagota | G06N 20/00 |
| 2017/0195307 A1* | 7/2017 | Jones-Mcfadden | H04W 12/06 |
| 2018/0089585 A1* | 3/2018 | Rickard, Jr. | G06N 20/00 |
| 2018/0096250 A1* | 4/2018 | Rickard, Jr. | G06N 5/022 |
| 2019/0109926 A1* | 4/2019 | Hotchkies | H04L 67/01 |
| 2020/0034477 A1* | 1/2020 | Skodinis | G06F 16/2228 |
| 2020/0242803 A1* | 7/2020 | Cui | G06F 16/904 |
| 2020/0387833 A1* | 12/2020 | Kursun | G06N 20/20 |
| 2021/0365863 A1* | 11/2021 | Friske | G06Q 30/0202 |
| 2021/0399911 A1* | 12/2021 | Jorasch | H04L 12/1822 |
| 2021/0400142 A1* | 12/2021 | Jorasch | H04L 65/1069 |
| 2022/0122721 A1* | 4/2022 | Alberico | G16H 50/20 |
| 2022/0292395 A1* | 9/2022 | Lahav | G06N 5/046 |
| 2022/0327378 A1* | 10/2022 | Rangan | G06N 3/047 |
| 2023/0319036 A1* | 10/2023 | Singh | G06F 21/31 726/4 |

\* cited by examiner

OBJECT SORTED LIST BASED ON HISTORICAL ENTITY INTERACTIONS

TECHNICAL FIELD

The present disclosure relates generally to access to sorted objects and, more particularly (although not necessarily exclusively), to object sorting based on historical entity interactions.

BACKGROUND

An entity can be associated with a set of objects, such as accounts, digital representations of devices, and the like, which may include one object, one hundred objects, one thousand objects, or more. The set of objects may be provided by a separate entity such as a product provider or a service provider. The entity can access the set of objects, and the separate entity can provide access to one or more objects of the set of objects to the entity. Providing access to the one or more objects can be difficult. For example, if the set of objects includes many individual objects, the arrangement in which to provide the individual objects to the entity may be unoptimized or otherwise inefficient.

SUMMARY

In one example, a system can include a processor device and a non-transitory computer-readable memory including instructions that can be executed by the processor device to perform various operations. The system can receive, from a user device, a request to access a set of objects associated with an entity. The system can access historical data relating to the entity. The historical data can include data associated with the set of objects of the entity. The system can determine a set of weights corresponding to the set of objects. Each weight of the set of weights can be determined based at least on a number of times a corresponding object has been used by the entity over a predetermined time period, a most recent use of the corresponding object by the entity, and an interaction type for which the corresponding object has been most used by the entity over the predetermined time period. The system can generate a sorted list for the set of objects by applying the set of weights to the set of objects. The system can provide a customizable user interface to the user device. The customizable user interface can include the sorted list that is configured to cause the customizable user interface to present a first object and a second object. The first object of the set of objects can be presented in a first location of the customizable user interface based on a corresponding first weight of the set of weights. The second object of the set of objects can be presented in a second location of the customizable user interface based on a corresponding second weight of the set of weights. The second location can be different than the first location, and the corresponding second weight can be different than the corresponding first weight.

In another example, a request to access a set of objects associated with an entity can be received by a user device. Historical data relating to the entity can be accessed. The historical data can include data associated with the set of objects of the entity. A set of weights corresponding to the set of objects can be determined. Each weight of the set of weights can be determined based at least on a number of times a corresponding object has been used by the entity over a predetermined time period, a most recent use of the corresponding object by the entity, and an interaction type for which the corresponding object has been most used by the entity over the predetermined time period. A sorted list for the set of objects can be generated by applying the set of weights to the set of objects. A customizable user interface can be provided to the user device. The customizable user interface can include the sorted list that is configured to cause the customizable user interface to present a first object and a second object. The first object of the set of objects can be presented in a first location of the customizable user interface based on a corresponding first weight of the set of weights. The second object of the set of objects can be presented in a second location of the customizable user interface based on a corresponding second weight of the set of weights. The second location can be different than the first location, and the corresponding second weight can be different than the corresponding first weight.

In a further example, a non-transitory computer-readable medium can include instructions that are executable by a processor for causing the processor to perform various operations. The operations can include receiving, from a user device, a request to access a set of objects associated with an entity. The operations can include accessing historical data relating to the entity. The historical data can include data associated with the set of objects of the entity. The operations can include determining a set of weights corresponding to the set of objects. Each weight of the set of weights can be determined based at least on a number of times a corresponding object has been used by the entity over a predetermined time period, a most recent use of the corresponding object by the entity, and an interaction type for which the corresponding object has been most used by the entity over the predetermined time period. The operations can include generating a sorted list for the set of objects by applying the set of weights to the set of objects. The operations can include providing a customizable user interface to the user device. The customizable user interface can include the sorted list that is configured to cause the customizable user interface to present a first object and a second object. The first object of the set of objects can be presented in a first location of the customizable user interface based on a corresponding first weight of the set of weights. The second object of the set of objects can be presented in a second location of the customizable user interface based on a corresponding second weight of the set of weights. The second location can be different than the first location, and the corresponding second weight can be different than the corresponding first weight.

DETAILED DESCRIPTION

Figure 1:
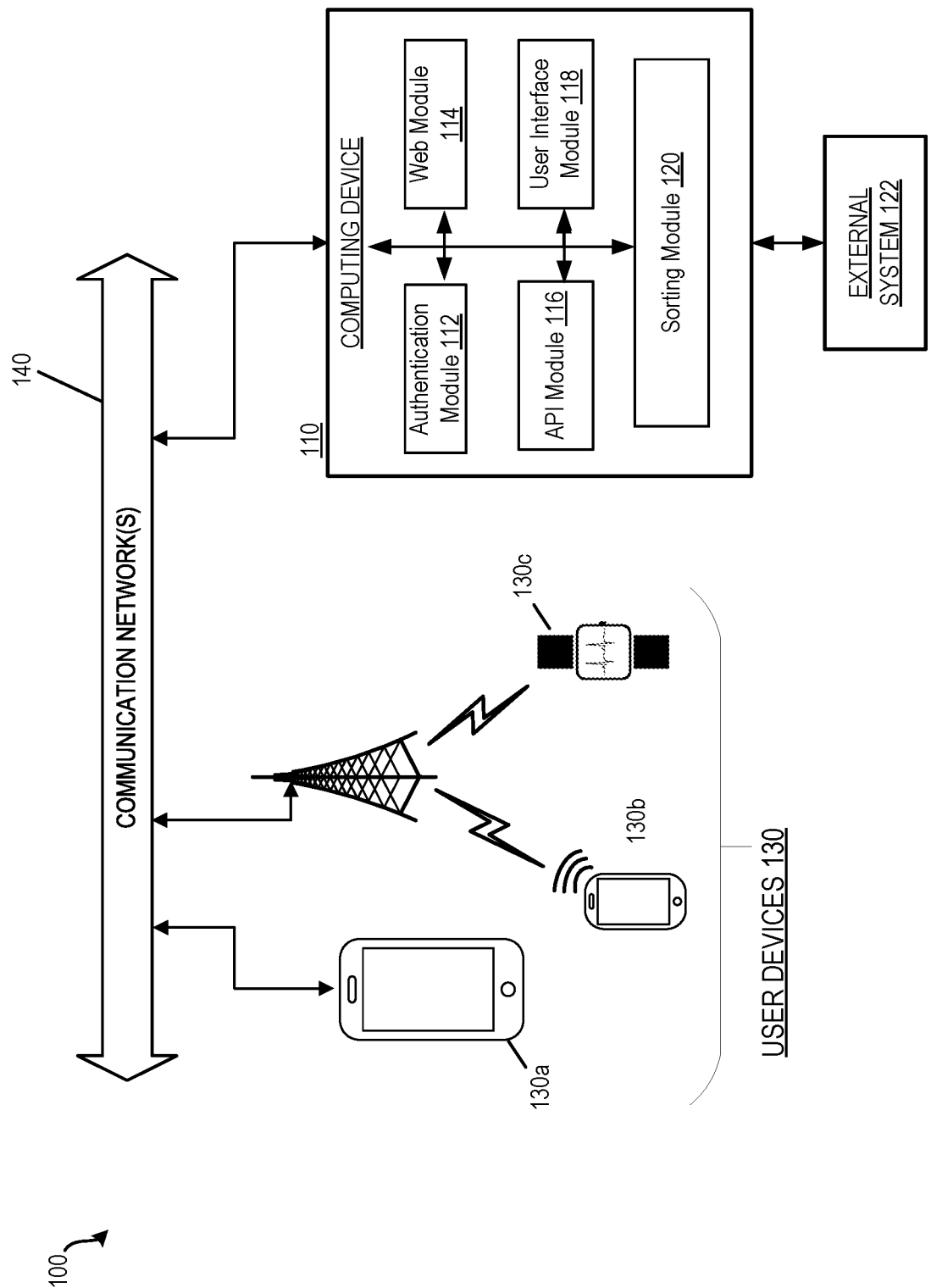
FIG. 1 is a schematic of a network environment in which a set of entity objects can be sorted based on historical interactions of an entity according to one example of the present disclosure.

Certain aspects and features relate to generating one or more ordered lists for a set of entity objects using weights determined for the set of entity objects based on historical interactions of an entity associated with the set of entity objects. The entity may include a user, individual, organization, or other suitable entity that can own the set of entity objects, that can operate the set of entity objects, that can access the set of entity objects, or any combination thereof. The set of entity objects can include one entity object, two entity objects, three entity objects, or any suitable additional numbers of entity objects. Each entity object of the set of entity objects may be or otherwise include (i) a financial services account, such as a bank account, investment account, and the like, (ii) a web-based account, such as a personal security account, a digital-access-control account, or the like, (iii) a digital representation of a physical device such as a security camera, a piece of physical computing hardware, and the like, etc. The ordered list may include a list of objects included in the entity objects such that the ordered list can present the objects in a particular order or arrangement determined, for example, at least in-part by the weights. The weights can be determined using a weighted algorithm, a trained machine-learning model, other techniques for determining weights, or any combination thereof. The weights may be determined based on the historical interactions of the entity. For example, the weighted algorithm, the trained machine-learning model, or the like can use historical interactions, such as previously executed interactions involving the entity and at least one entity object of the set of entity objects, or any attributes thereof, to determine the weights. Each of the determined weights may be applied to a respective object of the set of entity objects to indicate a likelihood that the entity may use or otherwise interact with the respective object and to generate the one or more ordered lists.

A system can generate a sorted list to provide the set of objects in an optimized, or otherwise enhanced, order, arrangement, or the like. For example, the system can capture or otherwise identify entity actions. The entity actions can include historical interactions between the entity and one or more objects of the set of objects, and the historical interactions can include the entity adjusting the one or more objects, selecting the one or more objects, using the one or more objects to interact with a separate entity, and the like. The system can generate a generic sorted list, a specific sorted list, and the like for the set of entity objects based on the entity actions. The generic sorted list, the specific sorted list, and the like can enhance a user experience of the entity with respect to accessing the set of objects. For example, the generic sorted list, the specific sorted list, or a combination thereof may optimize a presentation of the set of entity objects to the entity for improving an efficiency of the entity interacting with the set of entity objects by predicting which objects the entity is most likely with which to interact.

The order of the set of objects in the generic sorted list, the specific sorted list, etc. can be determined using historical interactions of the entity with respective entity objects of the set of entity objects. The system can use a sorting algorithm that can use a weighted model for determining weights for one or more of the entity objects. The weighted model may include weights or assign weights to particular objects such that the weights indicate a preference of the entity using a particular entity object for a particular interaction type for the generic sorted list. The weights for one or more of the objects can be changed according to the preferences of the entity over time.

Additionally or alternatively, the system can include, execute, or generate a weighted model corresponding to each interaction type of a set of interaction types. In some examples, the interaction types can include an asset transfer such as a bill pay operation, a wire transfer operation, etc., an adjustment to a physical computing device, an interaction of the entity with a separate entity using a particular object, and the like. The weighted model can include or indicate a preference of the entity using the set of entity objects based on entity objects used within a particular time period, which may include the previous 10 days, 30 days, 60 days, 90 days, six months, two years, etc. The weighted model can be used by a user interface of the system that facilitates an entity interacting with one or more entity objects of the set of entity objects for a particular interaction type. For example, an entity object used more frequently in general and more frequently within the last 30 days may be assigned a larger weight than a different entity object not used in the past 60 days. Accordingly, the entity object may be presented first, such as at the top of a list, for providing the entity object to the entity for facilitating one or more interactions by the entity using the entity object. The system can adapt the sort order of the set of entity objects in the user interface based on changing entity behavior and interaction with the set of entity objects over time.

In some examples, the system can train and execute a machine-learning model for determining weights for the objects. The machine-learning model may include a neural network, such as a deep-learning neural network, a recurrent neural network, and the like, a support vector machine, etc. The system can use historical interaction data relating to the entity to train the machine-learning model. For example, the system can access, receive, or generate the historical interaction data, which may include historical interactions initiated by or otherwise involving the entity and the set of objects. The system may label the historical interaction data or may use an unlabeled version of the historical interaction data to train the machine-learning model via supervised training techniques, unsupervised training techniques, semi-supervised training techniques, or any combination thereof. Training the machine-learning model may cause weights between layers of the machine-learning model to be tuned for optimizing predictions or other suitable outputs provided by the machine-learning model. For example, the system can train the machine-learning model and tune the weights of the machine-learning model to cause the machine-learning model to optimize outputs including a generic sorted list for the set of objects, a set of specific sorted lists for the set of objects with respect to one or more interaction types of a set of interaction types, etc.

These illustrative examples are given to introduce the reader to the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

FIG. 1 is a schematic of a network environment 100 in which a set of entity objects can be sorted based on historical interactions of an entity according to one example of the present disclosure. The network environment 100 can include entity devices 130, one or more communication networks 140, and a computing device 110. The entity devices 130 may request and access resources, such as web-based or application-based resources including a user interface, the set of entity objects, and the like, within or from the computing device 110 over one or more communications networks 140. The network environment 100 may correspond to a Wide Area Network ("WAN") environment, such as the Internet, through which the entity devices 130 may communicate with servers, such as the computing device 110, via web browsers or client-side applications, to establish communication sessions, request and receive web-based resources, and access other suitable features of applications or services.

The computing device 110 may be communicatively coupled to one or more external entities, such as external system 122, which may be associated with providing access to historical data about an entity or any objects associated therewith, or the like, through one or more networks. In some examples, the computing device 110 can provide the set of entity objects associated with the entity to the entity device 130. The external system 122 may be or otherwise include financial account data systems that include account data as objects associated with the entity, which may include a user of an entity device 130. The computing device 110 may be or include any type of server including, for example, a rack server, a tower server, a miniature server, a blade server, a mini rack server, a mobile server, an ultra-dense server, a super server, or the like. The computing device 110 may include various hardware components such as a motherboard, processing units, memory systems, hard drives, network interfaces, power supplies, etc. The computing device 110 may include one or more server farms, clusters, or any other appropriate arrangement or combination of computer servers. Additionally, the computing device 110 may act according to stored instructions located in a memory subsystem of the computing device 110 and may execute an operating system or other applications. In some examples, the computing device 110 may be other types of computer systems other than servers.

The computing device 110 may implement several different applications, services, or modules, and the computing device 110 may perform additional server-side functionality, including by an authentication module 112, a web module 114, an API module 116, a user interface module 118, a sorting module 120, other suitable modules, applications, or services, or any combination thereof. For example, in implementations of banking or financial services systems, electronic commerce systems, and the like, web-based resources, such as a webpage or any feature or functionality thereof, provided by the web module 114 may be used by the entity device 130 to access or request access to the set of entity objects that includes entity accounts and to perform various functions related to one or more of the entity accounts. The API module 116 may be configured to make API calls to the external system 122 to request access to historical data or the like associated with the entity, though in some examples, the historical data relating to the entity or to the set of entity objects may be stored locally on the computing device 110. The user interface module 118 may be configured to provide a user interface to the entity devices 130 for receiving information, such as login credentials or other confidential information, for providing information, such as information relating to the set of entity objects, etc. The sorting module 120 may be configured to determine weights for one or more objects of the set of entity objects and to generate one or more sorted lists of the set of entity objects based on the determined weights. The external system 122 may store information for the computing device 110 to implement functions relating to object access, permissions, financial services, or the like. In some examples, the authentication module 112 can be used to validate data prior to accessing requested features.

The entity devices 130, which can include suitable user devices for accessing web-based resources or application-based resources, can be capable of accessing and establishing communication sessions with the computing device 110 and, in some examples, the external system 122 through the communication networks 140. As illustrated in FIG. 1, entity devices 130a-130c correspond to mobile devices, including tablet computers 130a, smartphones 130b, and smart watches 130c, which may access the computing device 110 via a Local Area Network (LAN) or Wide Area Network (WAN), as well as mobile telecommunication networks, short-range wireless networks, or various other communication network types such as cable networks or satellite networks. Although certain examples herein are described in terms of entity devices 130, in other examples, the entity devices 130 may additionally or alternatively include other mobile or non-mobile computing devices capable of accessing the computing device 110 via the communications network 140.

Although certain components are shown in FIG. 1, other suitable, compatible, network hardware components and network architecture designs may be implemented in various embodiments to support communication between the computing device 110, the external system 122, and entity devices 130. Such communication networks may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the entity devices 130 and the computing device 110 in FIG. 1 may be local area networks, such as one based on Ethernet, Token-Ring or the like. Such network(s) also may be wide-area networks, such as the Internet, or may include financial or banking networks, telecommunication networks such as a public switched telephone networks (PSTNs), cellular or other wireless networks, satellite networks, television or cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
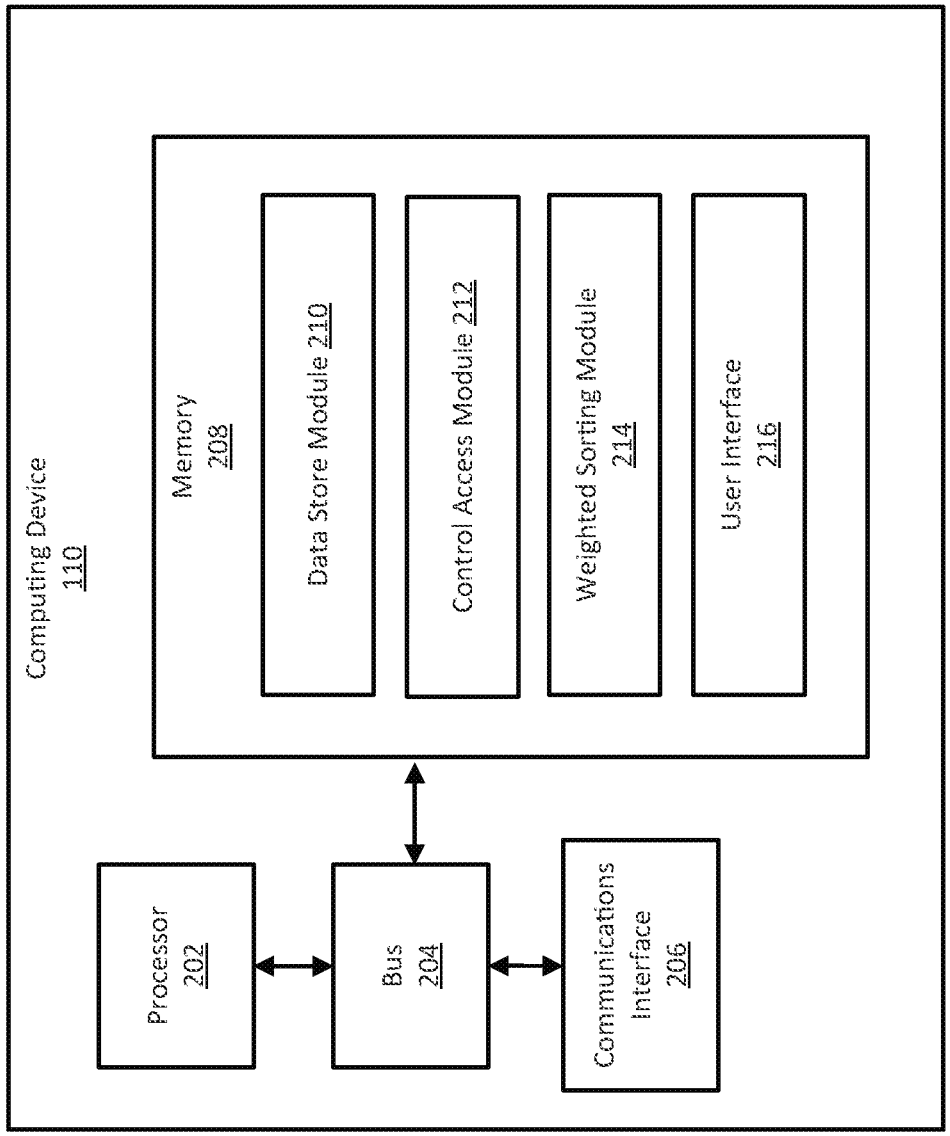
FIG. 2 is a block diagram of an example of a computing device configured to generate one or more sorted lists of the entity objects based on historical interactions of the entity according to one example of the present disclosure.

FIG. 2 is a block diagram of an example of a computing device 110 configured to generate one or more sorted lists of entity objects based on historical interactions of the entity with a set of entity objects according to one example of the present disclosure. The computing device 110 may be a network device and may include a processor 202, a bus 204, a communications interface 206, a memory 208, and other suitable components. In some examples, the components illustrated in FIG. 2 may be integrated into a single structure. For example, the components can be within a single housing. In other examples, the components illustrated in FIG. 2 can be distributed, for example in separate housings and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, Java, Perl, Python, etc.

The communications interface 206 may interface with other network devices or network-capable devices to analyze and receive information related to the set of entity objects, the entity, one or more sorted lists, and the like. Information received from the communications interface 206 may be sent to the memory 208 via the bus 204. The memory 208 can store any information received from the communications interface 206.

The memory 208 may include program code for receiving the historical interaction data, determining weights for the set of entity objects, generating one or more sorted lists based on the weights, and the like. The program code may cause the computing device 110, or any suitable component thereof, to generate a user interface 216 based on a request for accessing the set of entity objects. The computing device 110, or any suitable component thereof, may determine a level of access associated with the request, may generate a generic sorted list, specific sorted lists, or a combination, and the computing device 110 can customize the user interface 216, or any elements thereon, based on the determined level of access and the generated sorted lists. The memory 208 may additionally include program code for a data store module 210, a control access module 212, and any other suitable modules for performing the operations described herein. In some examples, the user interface 216 may be a customizable user interface that may be presented to the entity on an entity device 130 for providing the set of entity objects based on the generated sorted lists. In some examples, generating the sorted lists may providing at least a portion of the set of entity objects in an enhanced or otherwise optimized arrangement based on historical interactions of the entity.

The data store module 210 may store information relating to one or more sets of entity objects (e.g., username and password, security information, etc.) for a number of entities and associated client devices, including originating IP addresses of login attempts, browser settings of login attempts, etc. In some examples, the data store module 210 may store entity identifications, such as a username or other user ID, associated with a user account for the number of users. The control access module 212 may include or be communicatively coupled to an authentication service and may validate whether a user access attempt by an entity to access the set of entity objects or the user interface 216 has been successfully authenticated in response to receiving a request for access. The results from the control access module 212 may be used by the computing device 110 to generate the user interface 216. For example, the computing device 110 can generate the user interface 216 and can provide the set of entity objects in a particular arrangement. The control access module 212 may access a generic sorted list, one or more specific sorted lists, or a combination thereof generated for the set of entity objects and may cache the accessed sorted lists. Based on the cached lists, the computing device 110 can generate the user interface 216 by embedding the cached lists into the user interface 216 for presenting the set of entity objects in the particular arrangement.

Figure 3:
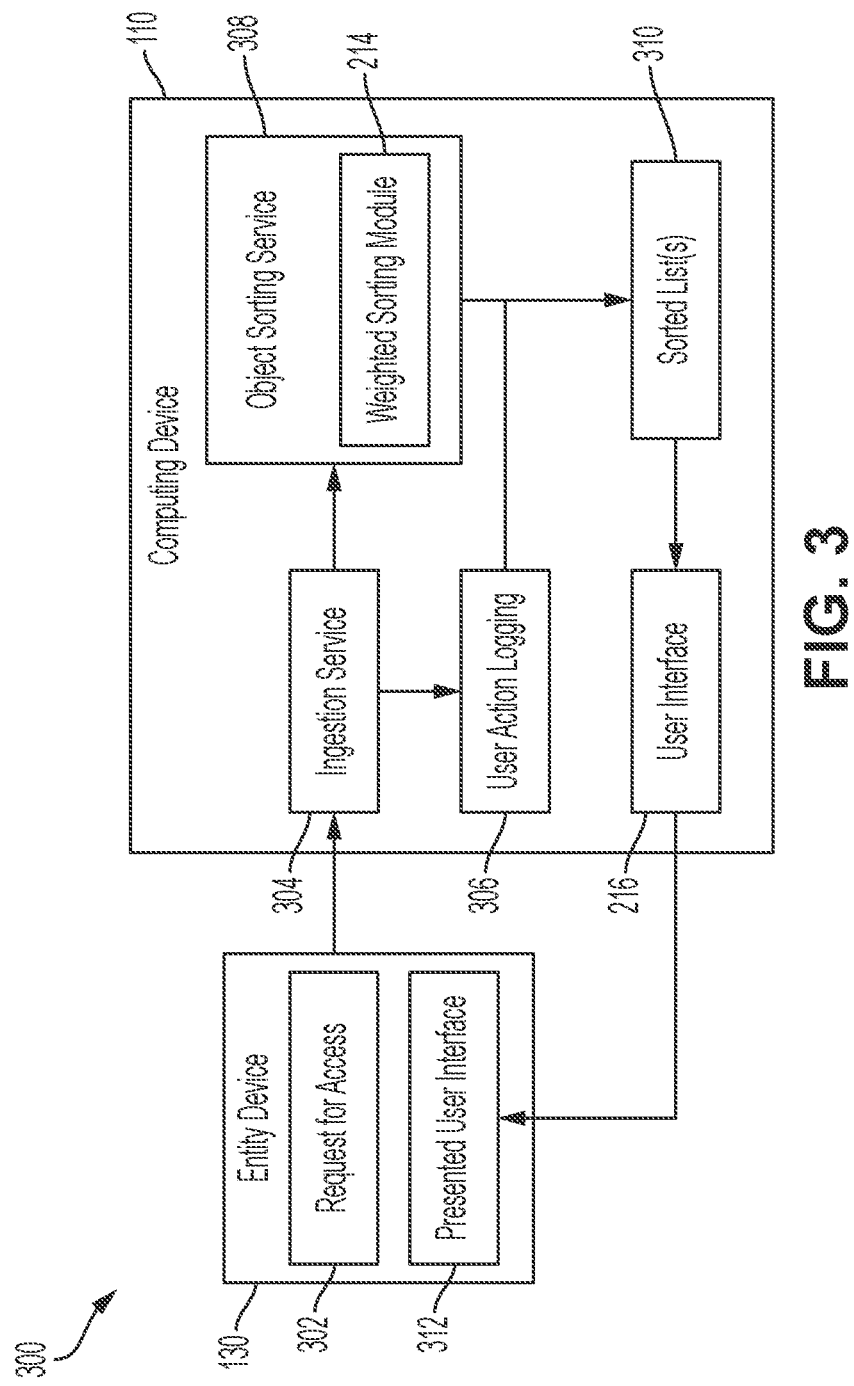
FIG. 3 is a data flow diagram of a process to generate one or more sorted lists of entity objects based on historical interactions of the entity according to one example of the present disclosure.

FIG. 3 is a data flow diagram 300 of a process to generate one or more sorted lists of entity objects based on historical interactions of the entity with the set of entity objects according to one example of the present disclosure. An entity device 130 can be used by an entity to generate an access request 302 such as a request to login to a user account provided by a provider entity. The access request 302 may include a request to access the user account, which may be owned, operated, or otherwise accessible by the entity. In some examples, the user account may include a set of objects including (i) accounts, such as financial services accounts, online security accounts, digital-access-control accounts, etc., (ii) physical assets, such as security cameras, servers, or other physical computing devices, etc., and the like. The entity device 130 can transmit the access request 302 to the computing device 110, which may be associated with the provider entity.

The computing device 110 can include an ingestion service 304 that can receive the access request 302, can validate the access request 302, and can perform other suitable techniques for ingesting the access request 302 into the computing device 110. In some examples, the access request 302 can involve a login attempt in which the entity attempts to login to the user account. The ingestion service 304 can, in response to authenticating the access request 302, communicate with a user action logging service 306 and an object sorting service 308. In some examples, the ingestion service 304 can execute one or more application programming interface (API) calls to separate computing devices, or separate components within the computing device 110, for communicating with the user action logging service 306, for communicating with the object sorting service 308, or for performing other suitable tasks. The user action logging service 306 can identify actions, can record actions, or a combination thereof relating to actions taken by the entity. For example, the user action logging service 306 can identify and store in a database, such as a client database, entity actions including logging into the user account, for example via the access request 302, initiating one or more interactions using a particular object or a particular set of objects included in the user account, or the like. The entity actions can include a type of action, a time or date of the action, a result of the action, an object used by the entity for the action, other entities involved in the action, and the like. In some examples, the entity actions may be accessed or otherwise used by the computing device 110 to generate one or more sorted lists for providing the set of objects in response to the access request 302.

The object sorting service 308 can determine weights for each entity object included in the user account, can generate one or more sorted lists based on the weights, and the like in response to the computing device 110 receiving the access request 302. In some examples, the object sorting service 308 can include a weighted sorting algorithm, a trained machine-learning model, or the like for performing suitable tasks relating to generating one or more sorted lists for the set of entity objects included in the user account. The object sorting service 308 may receive historical entity interaction data, determine weights for each entity object of the set of entity objects, generate one or more sorted lists based on the determined weights, and provide the one or more sorted lists in response to the access request 302.

The object sorting service 308 can receiving the historical entity interaction data, which may include a set of entity actions that were previously initiated or otherwise executed on behalf of the entity using one or more objects of a set of objects included in the user account. Each entity action of the set of entity actions can include a timestamp of the respective entity action, an object associated with the respective entity action, and other suitable information. The object sorting service 308 can execute the weighted sorting algorithm, the trained machine-learning model, or a combination thereof to generate weights for each object of the set of objects based on the set of entity actions. For example, the weights can indicate the likelihood of the entity using a particular object in a subsequent action. For each object of the set of objects, the weighted sorting algorithm, or the trained machine-learning model, can determine, based on the set of entity actions, how recently a particular object was used by the entity, how often the particular object was used by the entity, which interaction types for which the entity used the particular object most, etc. Accordingly, the object sorting service 308 can adjust the weights for each object of the set of objects to reflect an order of how likely the entity is to use each object of the set of objects in a subsequent generic interaction and in a subsequent particular interaction.

The object sorting service 308 can generate, based on the determined weights, a set of sorted lists 310 that can include a generic sorted list, an interaction-specific list, or a combination thereof. For example, the object sorting service 308 can generate the set of sorted lists 310 that includes one generic sorted list of the set of objects and three interaction-specific sorted lists of the set of objects corresponding to three different interaction types, though any other suitable number, such as less than three or more than three, of interaction types and interaction-specific sorted lists are possible. The object sorting service 308 can generate the generic sorted list based on a first set of weights for the set of objects, and the object sorting service 308 can generate each specific sorted list based on a set of second weights for the set of objects.

The first set of weights may be ambiguous with respect to a set of interaction types, whereas the set of second weights may be interaction-specific. For example, the first set of weights may indicate a first likelihood of the entity interacting with a respective object of the set of objects regardless of any potential interaction types. Additionally or alternatively, the set of second weights may indicate a second likelihood of the entity interacting with a respective object of the set of objects with respect to one or more potential interaction types. The object sorting service 308 may determine the first set of weights based on how recently each object of the set of objects was used with respect to any interaction type by the entity, how frequently each object has been used with respect to any interaction type by the entity, and the like. In some examples, the object sorting service 308 may additionally consider which interaction type is most commonly associated with each object of the set of objects. The object sorting service 308 can apply the first set of weights to the set of objects to generate the generic sorted list. In some examples, the generic sorted list can include a data object, such as a JSON file, that can be cached or otherwise stored for future access by the computing device 110 or the entity device 130. Additionally, the generic sorted list may present the set of objects in an order where the most prominently displayed object, such as the object presented at the top of the generic sorted list, is most likely to be used by the entity in a subsequent interaction without regard to the interaction type.

The object sorting service 308 may determine the set of second weights based on how recently each object of the set of objects was used with respect to each interaction type by the entity, how frequently each object has been used with respect to each interaction type by the entity, and the like. The object sorting service 308 can apply the set of second weights to the set of objects to generate one or more interaction-specific sorted lists. For example, if there are potentially four different interaction types, then the object sorting service 308 can generate four interaction-specific sorted lists, each of which corresponding to a different interaction type of the four interaction types. Additionally, the order or arrangement of the set of objects within a first interaction-specific sorted list of the four interaction-specific sorted lists may be different than the order or arrangement of the set of objects with a second interaction-specific sorted list of the four interaction-specific sorted lists.

The order or arrangement of the set of objects within each interaction-specific sorted list may indicate a likelihood of the entity selecting each of the objects of the set of objects to perform an interaction type corresponding to the respective interaction-specific sorted list. For example, a first object of the set of objects may include a larger weight than a weight of a second object of the set of objects with respect to a first interaction-specific sorted list, so the first object may be more prominently displayed (e.g., at the top of the interaction-specific sorted list) than the second object in the interaction-specific list since the entity may be more likely to select the first object than the second object for an interaction associated with the interaction-specific sorted list. Additionally, the second object may be displayed more prominently than the first object in a separate interaction-specific sorted list, for example if the second object includes a weight corresponding to the separate interaction-specific sorted list that is larger than that of the first object.

The computing device 110 can generate the set of sorted lists 310 and can generate the user interface 216. In some examples, the computing device 110 can generate the set of sorted lists 310 as a set of data objects, such as JSON files, and can embed the set of data objects in the user interface 216. In other examples, the computing device 110 can generate the set of sorted lists 310 and provide the set of sorted lists 310, for example as the set of data objects, to the entity device 130. The entity device 130 can receive the user interface 216, the set of sorted lists 310, and the like and can generate or otherwise display a user interface 312 that can present the set of sorted lists 310 and other suitable information to the entity or other user of the entity device 130. In some examples, the entity device 130 can separately receive the user interface 216 and the set of sorted lists 310 and may cache the set of sorted lists 310. The entity device 130 can subsequently access the cached sorted lists and generate the user interface 312 using one or more sorted lists, such as the generic sorted list, one or more of the interaction-specific sorted lists, or a combination thereof, to provide the set of entity objects to the entity via the entity device 130.

Figure 4:
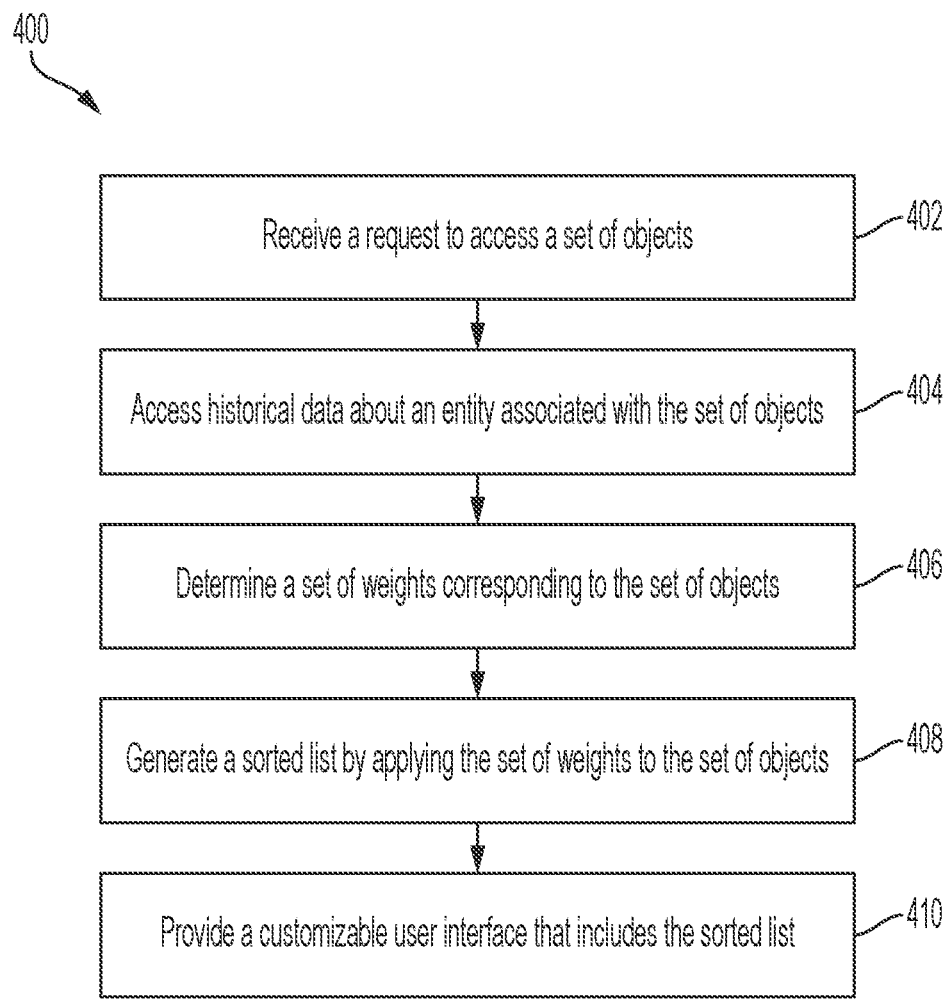
FIG. 4 is a flowchart of a process for generating one or more sorted lists of entity objects based on historical interactions of the entity according to one example of the present disclosure.

FIG. 4 is a flowchart of a process 400 for generating one or more sorted lists of entity objects based on historical interactions of the entity with the set of entity objects according to one example of the present disclosure. At block 402, the computing device 110 receives a request to access a set of objects. In some examples, the request may be similar or identical to the access request 302 illustrated and described with respect to FIG. 3. The request may include an access request for accessing a user account that may include or otherwise be configured to provide access to the set of objects. In some examples, the set of objects can include accounts, digital representations of physical assets, such as physical computing hardware, or the like.

At block 404, the computing device 110 accesses historical data about an entity associated with the set of objects. The computing device 110 may make an API call, for example to the external system 122, to access the historical data, may access the historical data that is stored on the computing device 110, or a combination thereof. The historical data may include a set of log entries or other suitable type of data that includes information relating to previously executed interactions involving the entity and at least one object of the set of objects. For example, the information may include an object used to execute a particular interaction, a time of requesting the particular interaction, a time of executing the particular interaction, etc. Additionally, the historical data may indicate how frequently each object is used by the entity, how recently each object was used by the entity, interactions most associated with each object, and the like. And, the historical data may indicate which interaction was historically most used or requested to be executed by the entity. In some examples, the computing device 110 can receive the information, can extract the information based on received data included in the historical data, or a combination thereof.

At block 406, the computing device 110 determines a set of weights corresponding to the set of objects. In some examples, the computing device 110 can determine a first set of weights and a second set of weights. The first set of weights may include weights that are interaction-generic, and the second set of weights may include weights that are interaction-specific. For example, the interaction-generic weights may indicate, for respective objects, a likelihood of the entity using a particular object to execute any interaction, whereas the interaction-specific weights may indicate, for respective objects, a likelihood of the entity using a particular object to execute a particular interaction. In some examples, the second set of weights may include multiple sets of weights, each set thereof including weights corresponding to a different interaction type.

In some examples, the computing device 110 can execute an object sorting service, which may include a weighted sorting algorithm, a trained machine-learning model, or the like, to determine the set of weights. The computing device 110 can input the historical data about the entity into the object sorting service to determine the weights. In examples in which the object sorting service includes the weighted sorting algorithm, the weighted sorting algorithm can receive the historical data and can perform one or more calculations to determine the weights. In examples in which the object sorting service includes the trained machine-learning model, the trained machine-learning model can receive the historical data and can transform the historical data through one or more machine-learning layers to output a prediction that includes the weights.

The object sorting service may use one or more different parameters included in the historical data to determine the weights. For example, the object sorting service may use a most recent use of an object by the entity to determine the weights for the object, a frequency of the entity using the object to determine the weights for the object, an interaction type most executed by the entity using the object to determine the weights for the object, or a combination thereof. The object sorting service may consider how frequently objects were historically used by the entity to execute particular interaction types to determine weights included in the second set of weights. But, the object sorting service may not consider how frequently objects were historically used by the entity to execute particular interaction types to determine weights included in the first set of weights.

At block 408, the computing device 110 generates a sorted list by applying the set of weights to the set of objects. The computing device 110 may generate a generic sorted list, a set of interaction-specific sorted lists, or a combination thereof. The set of interaction-specific sorted lists may include one interaction-specific sorted list, two interaction-specific sorted lists, three interaction-specific sorted lists, or any suitable additional numbers of interaction-specific sorted lists. In some examples, a size of the set of interaction-specific sorted lists may correspond to a number of potential interaction types, for example that may have been previously executed by the entity, involving the set of objects, or a combination thereof.

The computing device 110 can apply the first set of weights to the set of objects to generate the generic sorted list. For example, the computing device 110 may individually apply each weight of the first set of weights to each corresponding object of the set of objects. Thus, each object may include one weight from the first set of weights, and the one weight may indicate how likely the entity is to use the respective object in a subsequent interaction regardless of the interaction type. A larger weight may cause the respective object to be more prominently displayed than other objects of the set of objects. For example, a first object that includes the largest weight among the set of objects may be caused to be displayed by the generic sorted list more prominently than any of the other objects of the set of objects. More prominently displayed may include displaying the first object at the top of a list including the set of objects, displaying the first object larger than any other object of the set of objects, or otherwise displaying the first object such that the entity is likely to perceive the first object prior to the other objects of the set of objects.

The computing device 110 can apply the second set of weights to the set of objects to generate one or more interaction-specific sorted lists. For example, the computing device 110 may individually apply a subset of the second set of weights to each corresponding object of the set of objects for each potential interaction type. Thus, each object may include one weight from the second set of weights for each potential interaction type, and the one weight may indicate how likely the entity is to use the respective object in a subsequent interaction for a corresponding interaction type. For example, if there are four potential interaction types, the computing device 110 may apply four different weights to each object of the set of objects to generate four different interaction-specific sorted lists, each corresponding to a different potential interaction type. A larger weight may cause the respective object to be more prominently displayed than other objects of the set of objects. For example, a first object that includes the largest weight among the set of objects for a first interaction-specific sorted list may be caused to be displayed by the first interaction-specific sorted list more prominently than any of the other objects of the set of objects. Additionally, the first object may not include the largest weight among the set of objects for a second interaction-specific sorted list and may not be caused to be displayed by the second interaction-specific sorted list more prominently than any of the other objects of the set of objects.

In some examples, the operations of the block 404, the block 406, the block 408, or any combination thereof may be performed periodically or on-demand. For example, and for a particular entity, the computing device 110 may periodically, such as every one minute, every one hour, every one day, every one week, etc., access historical data, determine weights for the set of objects, generate the sorted lists, or any combination thereof. In other examples, the computing device 110 may access historical data, determine weights for the set of objects, generate the sorted lists, or any combination thereof, in response to receiving a request, for example from the particular entity, to access the set of objects.

At block 410, the computing device 110 provides a customizable user interface that includes the sorted list. The customizable user interface may be configured to provide the set of objects to the entity, for example via an entity device 130. The computing device 110 can generate or otherwise receive the generated sorted lists and can embed the generated sorted lists in the customizable user interface, can provide the generated sorted list as a separate file for the entity device, or a combination thereof. The customizable user interface may provide the generic sorted list, the set of interaction-specific sorted lists, or a combination thereof. For example, the user may select an option to receive access to the set of objects based on the generic sorted list, the set of interaction-specific sorted lists, or a combination thereof. The customizable user interface may include the generic sorted list in a first location, a first interaction-specific sorted list in a second location, a second interaction-specific list in a third location, etc.

Figure 5:
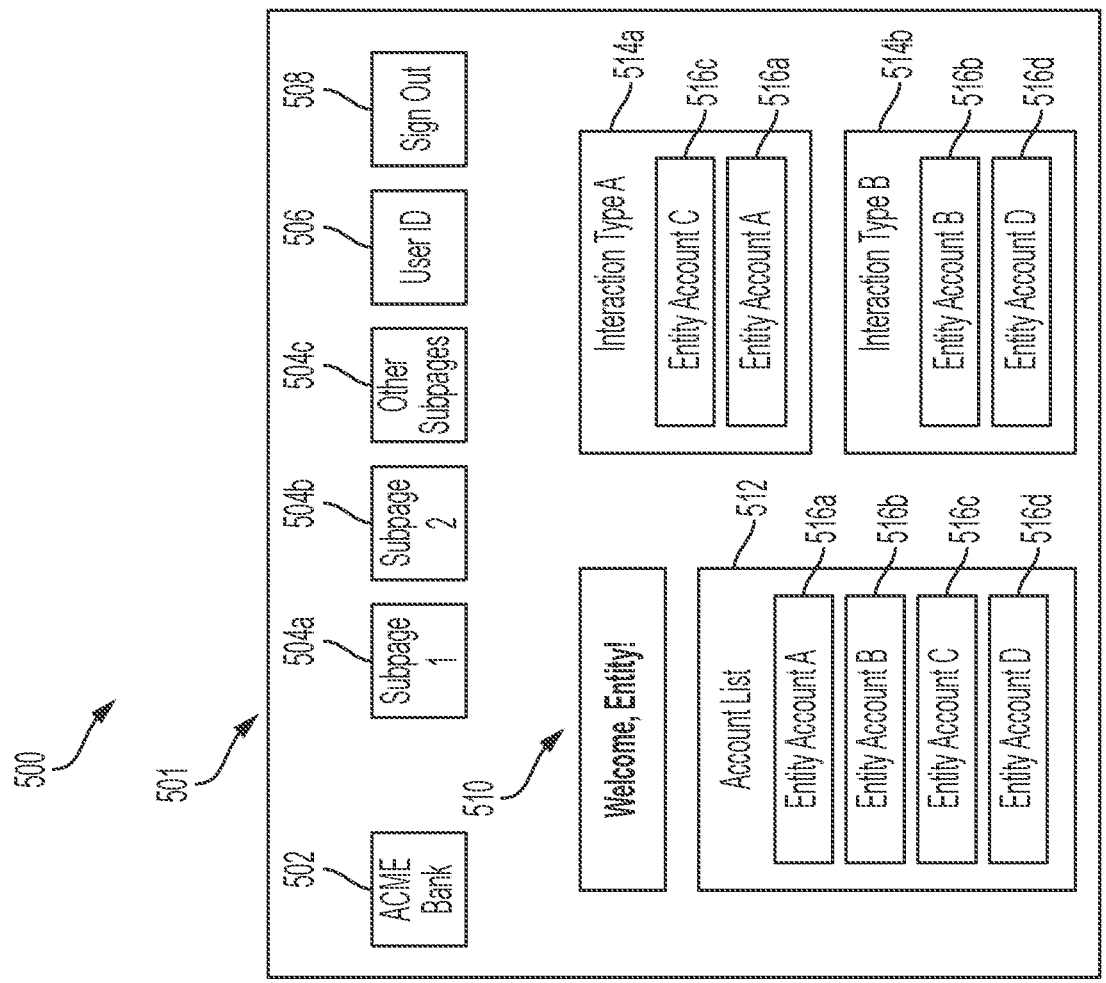
FIG. 5 is an example of a customizable user interface for providing a set of entity objects based on historical interactions of the entity according to one example of the present disclosure.

FIG. 5 is an example of a customizable user interface 500 for providing a set of entity objects based on historical interactions of the entity with the set of entity objects according to one example of the present disclosure. As illustrated, the customizable user interface 500 provides a set of entity objects that includes financial services accounts, though other suitable entity objects, such as physical computing hardware, and the like, can be provided via the customizable user interface 500. The computing device 110 may generate and provide the customizable user interface 500 to the entity, for example via the entity device 130. In some examples, the illustrated customizable user interface 500 is an example of a user interface provided to an entity subsequent to the computing device 110 receiving and authenticating a request by the entity to access a set of objects associated with the entity.

As illustrated, the customizable user interface 500 includes an upper region 501 that includes a provider entity identification 502, navigational tabs 504a-c, an entity identification 506, and a sign out feature 508. The provider entity identification 502 may include a name, a logo, or other suitable identification information that indicates that the customizable user interface 500 is provided by the provider entity. The navigational tabs 504a-c may each include an interactive feature that, when interacted with (e.g., via a mouse click), may cause the computing device 110 to provide a different page of the customizable user interface 500. For example, if the entity interacts with the navigation tab 504a, the computing device 110 may provide Subpage 1, etc. The entity identification 506 may include an interactive feature that, when interacted with, causes the computing device 110 to provide user account information associated with the entity indicated by the entity identification 506. The sign out feature 508 may include an interactive feature that, when interacted with, causes the computing device 110 to cease providing the customizable user interface 500 to the entity.

Additionally, the customizable user interface 500 can include a lower region 510 that includes one or more sorted lists. As illustrated, the lower region 510 includes a generic sorted list 512 and two interaction-specific sorted lists 514a-b, though any other suitable number, such as less than two or more than two, interaction-specific sorted lists can be provided in the lower region 510. The generic sorted list 512 includes entity objects 516a-d, the interaction-specific sorted list 514a includes the entity object 516a and the entity object 516c, and the interaction-specific sorted list 514b includes the entity object 516b and the entity object 516d. The generic sorted list 512 may provide the entity objects 516a-d in a particular order or arrangement based on weights determined for the entity objects 516a-d. For example, the entity object 516a may include a larger weight than the entity object 516b, which may include a larger weight than the entity object 516c, which may include a larger weight than the entity object 516d, etc. While illustrated as a list of objects, the generic sorted list 512 may provide the entity objects 516a-d in different arrangements such as varying sizes for the entity objects 516a-d based on the weights, etc.

The interaction-specific sorted lists 514a-b may be provided via the customizable user interface 500 horizontally offset from the generic sorted list 512 or in other suitable arrangements with respect to the generic sorted list 512. The interaction-specific sorted list 514a may provide the entity object 516a and the entity object 516c in a particular order or arrangement based on weights determined therefor and based on an interaction type corresponding to the interaction-specific sorted list 514a. For example, the entity object 516c may include a larger weight than the entity object 516a, which may cause the entity object 516c to be displayed more prominently than the entity object 516a. While illustrated as a list of objects, the interaction-specific sorted list 514a may provide the entity object 516a and the entity object 516c in different arrangements such as varying sizes for the respective entity objects based on the weights, etc. Additionally, the entity object 516b and the entity object 516d may not have been previously used by the entity for the interaction type corresponding to the interaction-specific sorted list 514a.

The interaction-specific sorted list 514b may be provided via the customizable user interface 500 vertically offset from the interaction-specific sorted list 514a. In some examples, the interaction-specific sorted list 514a may correspond to an interaction type more likely to be executed or requested by the entity than an interaction type corresponding to the interaction-specific sorted list 514b. The interaction-specific sorted list 514b may provide the entity object 516b and the entity object 516d in a particular order or arrangement based on weights determined therefor and based on an interaction type corresponding to the interaction-specific sorted list 514*b*. For example, the entity object 516*b* may include a larger weight than the entity object 516*d*, which may cause the entity object 516*b* to be displayed more prominently than the entity object 516*d*. While illustrated as a list of objects, the interaction-specific sorted list 514*b* may provide the entity object 516*b* and the entity object 516*d* in different arrangements such as varying sizes for the respective entity objects based on the weights, etc. Additionally, the entity object 516*a* and the entity object 516*c* may not have been previously used by the entity for the interaction type corresponding to the interaction-specific sorted list 514*b*.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
   a processor device; and
   a non-transitory computer-readable memory including instructions that are executable by the processor device to perform operations comprising:
     receiving, from a user device, a request to access a set of objects associated with an entity;
     accessing historical data relating to the entity, the historical data including data associated with the set of objects of the entity;
     generating, based on preferences of the entity indicated by the historical data, a weighted model that is configured to determine a first set of weights and a second set of weights corresponding to the set of objects, wherein the operation of generating the weighted model comprises generating each weight of the first set of weights based at least on a number of times a corresponding object has been used by the entity over a predetermined time period and a most recent use of the corresponding object by the entity, and wherein the operation of generating the weighted model comprises generating each weight of the second set of weights based at least in part on an interaction type for which the corresponding object has been most used by the entity over the predetermined time period;
     generating (i) a first sorted list for the set of objects by applying the first set of weights to the set of objects, and (ii) a second sorted list for the set of objects by applying the second set of weights to the set of objects; and
     providing a customizable user interface to the user device, the customizable user interface including the first sorted list or the second sorted list that is configured to cause the customizable user interface to present:
       a first object of the set of objects in a first location of the customizable user interface based on a corresponding first weight of the first set of weights or the second set of weights being higher than other weights of the first set of weights or the second set of weights, wherein the first object is a sorted list; and
       a second object of the set of objects in a second location of the customizable user interface based on a corresponding second weight of the first set of weights or the second set of weights being higher than the other weights of the first set of weights or the second set of weights but less than the corresponding first weight, the second location different than the first location, wherein the second object includes two or more sorted lists that are separate from the sorted list, wherein the second location is associated with a first likelihood of interaction by the user device that is higher than a second likelihood of interaction associated with the first location, wherein the first location is a left-hand side of the customizable user interface, and the second location is a right-hand side of the customizable user interface.

2. The system of claim 1, wherein each weight included in the first set of weights is a first type of weight that indicates a likelihood of the entity using a respective object of the set of objects regardless of interaction type, and wherein the operation of determining the first set of weights includes:
   determining the second set of weights for the set of objects, wherein each weight of the second set of weights is determinable based at least on an amount of times a corresponding object has been used over the predetermined time period for a particular interaction and a most recent use of the corresponding object for the particular interaction.

3. The system of claim 2, wherein the sorted list is an interaction-generic sorted list of the set of objects that is configured to cause the set of objects to be arranged according to a likelihood of the entity using each object of the set of objects regardless of interaction type, and wherein the operation of generating the sorted list includes generating a second sorted list that is an interaction-specific sorted list of the set of objects that is configured to cause the set of objects to be ordered by a likelihood of the entity using each object of the set of objects based on interaction type.

4. The system of claim 1, wherein the first location is vertically offset from the second location, wherein the first location is above the second location, and wherein the operation of providing the customizable user interface includes:
   embedding the sorted list in a first interactive feature positioned in a first portion of the customizable user interface, wherein the first location and the second location are included in the first portion, and wherein the sorted list is configured to cause the set of objects to be presented in the first interactive feature and ordered by a likelihood of the entity using a respective object of the set of objects regardless of interaction type; and
   embedding a second sorted list in a second interactive feature positioned in a second portion of the customizable user interface, wherein the second portion is horizontally offset from the first portion, and wherein the second sorted list is configured to cause the set of objects to be presented in the second interactive feature and ordered by a likelihood of the entity using the respective object of the set of objects based on interaction type.

5. The system of claim 4, wherein the second interactive feature includes a plurality of interactive features, wherein each interactive feature of the plurality of interactive features corresponds to a different interaction type of a plurality of interaction types, wherein the second sorted list includes a plurality of second sorted lists, wherein each second sorted list of the plurality of second sorted lists corresponds to a particular interaction type of the plurality of interaction types, and wherein the operation of embedding the second sorted list in the second interactive feature includes:
  embedding each second sorted list of the plurality of second sorted lists into a respective interactive feature of the plurality of interactive features, wherein each interactive feature of the plurality of interactive features is configured to present the set of objects ordered by likelihood of the entity using the respective object of the set of objects with respect to a corresponding interaction type of the plurality of interaction types.

6. The system of claim 1, wherein the set of objects includes one or more financial services accounts, and wherein the interaction type includes a financial service interaction that involves a transfer of assets.

7. The system of claim 1, wherein the historical data is usable as a training dataset, and wherein the operations further comprise:
  training, using the training dataset, a machine-learning model to generate a trained machine-learning model; and
  executing the trained machine-learning model to determine the first set of weights and to generate the sorted list based on the first set of weights.

8. A method comprising:
  receiving, by a computing device and from a user device, a request to access a set of objects associated with an entity;
  accessing, by the computing device, historical data relating to the entity, the historical data including data associated with the set of objects of the entity;
  generating, by the computing device and based on preferences of the entity indicated by the historical data, a weighted model that is configured to determine a first set of weights and a second set of weights corresponding to the set of objects, wherein generating the weighted model comprises generating each weight of the first set of weights based at least on a number of times a corresponding object has been used by the entity over a predetermined time period and a most recent use of the corresponding object by the entity, and wherein generating the weighted model comprises generating each weight of the second set of weights based at least in part on an interaction type for which the corresponding object has been most used by the entity over the predetermined time period;
  generating, based on preferences of the entity indicated by the historical data,
  generating, by the computing device, (i) a first sorted list for the set of objects by applying the first set of weights to the set of objects, and (ii) a second sorted list for the set of objects by applying the second set of weights to the set of objects; and
  providing, by the computing device, a customizable user interface to the user device, the customizable user interface including the first sorted list or the second sorted list that is configured to cause the customizable user interface to present:
    a first object of the set of objects in a first location of the customizable user interface based on a corresponding first weight of the first set of weights or the second set of weights being higher than other weights of the first set of weights or the second set of weights, wherein the first object is a sorted list; and
    a second object of the set of objects in a second location of the customizable user interface based on a corresponding second weight of the first set of weights or the second set of weights being higher than the other weights of the first set of weights or the second set of weights but less than the corresponding first weight, the second location different than the first location, wherein the second object includes two or more sorted lists that are separate from the sorted list, wherein the second location is associated with a first likelihood of interaction by the user device that is higher than a second likelihood of interaction associated with the first location, wherein the first location is a left-hand side of the customizable user interface, and the second location is a right-hand side of the customizable user interface.

9. The method of claim 8, wherein each weight included in the first set of weights is a first type of weight that indicates a likelihood of the entity using a respective object of the set of objects regardless of interaction type, and wherein determining the first set of weights includes:
  determining, by the computing device, the second set of weights for the set of objects, wherein each weight of the second set of weights is determined based at least on an amount of times a corresponding object has been used over the predetermined time period for a particular interaction and a most recent use of the corresponding object for the particular interaction.

10. The method of claim 9, wherein the sorted list is an interaction-generic sorted list of the set of objects that is configured to cause the set of objects to be arranged according to a likelihood of the entity using each object of the set of objects regardless of interaction type, and wherein generating the sorted list includes generating, by the computing device, a second sorted list that is an interaction-specific sorted list of the set of objects that is configured to cause the set of objects to be ordered by a likelihood of the entity using each object of the set of objects based on interaction type.

11. The method of claim 8, wherein the first location is vertically offset from the second location, wherein the first location is above the second location, and wherein providing the customizable user interface includes:
  embedding, by the computing device, the sorted list in a first interactive feature positioned in a first portion of the customizable user interface, wherein the first location and the second location are included in the first portion, and wherein the sorted list is configured to cause the set of objects to be presented in the first interactive feature and ordered by a likelihood of the entity using a respective object of the set of objects regardless of interaction type; and
  embedding, by the computing device, a second sorted list in a second interactive feature positioned in a second portion of the customizable user interface, wherein the second portion is horizontally offset from the first portion, and wherein the second sorted list is configured to cause the set of objects to be presented in the second interactive feature and ordered by a likelihood of the entity using the respective object of the set of objects based on interaction type.

12. The method of claim 11, wherein the second interactive feature includes a plurality of interactive features, wherein each interactive feature of the plurality of interactive features corresponds to a different interaction type of a plurality of interaction types, wherein the second sorted list includes a plurality of second sorted lists, wherein each second sorted list of the plurality of second sorted lists corresponds to a particular interaction type of the plurality of interaction types, and wherein embedding the second sorted list in the second interactive feature includes:
  embedding, by the computing device, each second sorted list of the plurality of second sorted lists into a respective interactive feature of the plurality of interactive features, wherein each interactive feature of the plurality of interactive features is configured to present the set of objects ordered by likelihood of the entity using the respective object of the set of objects with respect to a corresponding interaction type of the plurality of interaction types.

13. The method of claim 8, wherein the set of objects includes one or more financial services accounts, and wherein the interaction type includes a financial service interaction that involves a transfer of assets.

14. The method of claim 8, wherein the historical data is a training dataset, further comprising:
  training, by the computing device and using the training dataset, a machine-learning model to generate a trained machine-learning model; and
  executing, by the computing device, the trained machine-learning model to determine the first set of weights and to generate the sorted list based on the first set of weights.

15. A non-transitory computer-readable medium comprising instructions that are executable by a processor for causing the processor to perform operations comprising:
  receiving, from a user device, a request to access a set of objects associated with an entity;
  accessing historical data relating to the entity, the historical data including data associated with the set of objects of the entity;
  generating, based on preferences of the entity indicated by the historical data, a weighted model that is configured to determine a first set of weights and a second set of weights corresponding to the set of objects, wherein the operation of generating the weighted model comprises generating each weight of the first set of weights based at least on a number of times a corresponding object has been used by the entity over a predetermined time period and a most recent use of the corresponding object by the entity, and wherein the operation of generating the weighted model comprises generating each weight of the second set of weights based at least in part on an interaction type for which the corresponding object has been most used by the entity over the predetermined time period;
  generating (i) a first sorted list for the set of objects by applying the first set of weights to the set of objects, and (ii) a second sorted list for the set of objects by applying the second set of weights to the set of objects; and
  providing a customizable user interface to the user device, the customizable user interface including the first sorted list or the second sorted list that is configured to cause the customizable user interface to present:
    a first object of the set of objects in a first location of the customizable user interface based on a corresponding first weight of the first set of weights or the second set of weights being higher than other weights of the first set of weights or the second set of weights, wherein the first object is a sorted list; and
    a second object of the set of objects in a second location of the customizable user interface based on a corresponding second weight of the first set of weights or the second set of weights being higher than the other weights of the first set of weights or the second set of weights but less than the corresponding first weight, the second location different than the first location, wherein the second object includes two or more sorted lists that are separate from the sorted list, wherein the second location is associated with a first likelihood of interaction by the user device that is higher than a second likelihood of interaction associated with the first location, wherein the first location is a left-hand side of the customizable user interface, and the second location is a right-hand side of the customizable user interface.

16. The non-transitory computer-readable medium of claim 15, wherein each weight included in the first set of weights is a first type of weight that indicates a likelihood of the entity using a respective object of the set of objects regardless of interaction type, and wherein the operation of determining the first set of weights includes:
  determining the second set of weights for the set of objects, wherein each weight of the second set of weights is determinable based at least on an amount of times a corresponding object has been used over the predetermined time period for a particular interaction and a most recent use of the corresponding object for the particular interaction.

17. The non-transitory computer-readable medium of claim 16, wherein the sorted list is an interaction-generic sorted list of the set of objects that is configured to cause the set of objects to be arranged according to a likelihood of the entity using each object of the set of objects regardless of interaction type, and wherein the operation of generating the sorted list includes generating a second sorted list that is an interaction-specific sorted list of the set of objects that is configured to cause the set of objects to be ordered by a likelihood of the entity using each object of the set of objects based on interaction type.

18. The non-transitory computer-readable medium of claim 15, wherein the first location is vertically offset from the second location, wherein the first location is above the second location, and wherein the operation of providing the customizable user interface includes:
  embedding the sorted list in a first interactive feature positioned in a first portion of the customizable user interface, wherein the first location and the second location are included in the first portion, and wherein the sorted list is configured to cause the set of objects to be presented in the first interactive feature and ordered by a likelihood of the entity using a respective object of the set of objects regardless of interaction type; and
  embedding a second sorted list in a second interactive feature positioned in a second portion of the customizable user interface, wherein the second portion is horizontally offset from the first portion, and wherein the second sorted list is configured to cause the set of objects to be presented in the second interactive feature and ordered by a likelihood of the entity using the respective object of the set of objects based on interaction type.

19. The non-transitory computer-readable medium of claim 18, wherein the second interactive feature includes a plurality of interactive features, wherein each interactive feature of the plurality of interactive features corresponds to a different interaction type of a plurality of interaction types, wherein the second sorted list includes a plurality of second sorted lists, wherein each second sorted list of the plurality of second sorted lists corresponds to a particular interaction type of the plurality of interaction types, and wherein the operation of embedding the second sorted list in the second interactive feature includes:

embedding each second sorted list of the plurality of second sorted lists into a respective interactive feature of the plurality of interactive features, wherein each interactive feature of the plurality of interactive features is configured to present the set of objects ordered by likelihood of the entity using the respective object of the set of objects with respect to a corresponding interaction type of the plurality of interaction types.

20. The non-transitory computer-readable medium of claim 15, wherein the historical data is usable as a training dataset, and wherein the operations further comprise:

training, using the training dataset, a machine-learning model to generate a trained machine-learning model; and executing the trained machine-learning model to determine the first set of weights and to generate the sorted list based on the first set of weights.

\* \* \* \* \*